Patented Nov. 7, 1922.

1,434,462

UNITED STATES PATENT OFFICE.

THEODORE B. WAGNER, OF BROOKLYN, NEW YORK.

YEAST AND PROCESS OF MAKING THE SAME.

No Drawing. Application filed May 9, 1921. Serial No. 468,167.

*To all whom it may concern:*

Be it known that I, THEODORE B. WAGNER, a citizen of the United States, residing at Brooklyn, in the county of Kings and State of New York, have invented certain new and useful Improvements in Yeast and Processes of Making the Same, of which the following is a specification.

My invention relates to yeast and more especially to what is known as bakers' yeast and has for its object a new process of making such yeast, thereby producing an improved yeast while at the same time reducing the cost of production.

In the manufacture of compressed bakers' yeast various kinds of grains have been used heretofore as raw materials, but on account of the high prices prevailing during the last few years, other raw materials have come to be used, for instance, molasses, as obtained in the manufacture of beet sugar. Such molasses contains considerable amounts of fermentable sugar, nitrogenous compounds and various plant salts commonly designated as "nutrition salts". However, the "nutrition salts" contained in beet molasses are usually not sufficient to properly propagate the yeast and to insure a vigorous fermentation and satisfactory yields, and therefore, it is common practice to add inorganic chemicals, such as ammonia, ammonium phosphate, ammonium sulphate, etc., which are also regarded as "nutrition salts".

Now, I have discovered a new and very satisfactory material which contains the plant salts in concentrated form, and therefore furnishes ideal nutrition for the yeast. This new material enables me if I so elect to discard beet molasses altogther which is desirable from an economical standpoint for instead of the high priced beet molasses I can use, together with my new material, any substance containing fermentable sugars or sugar producing ingredients. Thus, for instance, I can use sugar syrups of any kinds, so-called refiners' syrup cane molasses, glucose syrup, grape sugar syrups, or any syrups obtained as by-products in the manufacture of the aforesaid syrups and molasses. Also, I can use starch, or "second grade" or offal products obtained in the manufacture of starch, or other milled cereal products. These latter products require, of course, a previous suitable treatment before fermentation such as "mashing" with malt, or treatment with hydrolyzing or catalyzing agents.

The material which I have discovered is the aqueous extract of corn obtained in the manufacture of starch, glucose, and maltose, and which extract is commonly known as "steep water". The dry matter contained therein is known as "corn solubles". This material is obtained in the following manner:

Corn is steeped in water acidulated with sulphur dioxide, the acidity approximating one-third of 1%, calculated as sulphur dioxide. The temperature of the water is usually maintained at about 120° F. and the corn is steeped in such water for about 48 hours, which time suffices to extract from the corn practically all the "corn solubles". The latter consist primarily of organic phosphorus salts of the phytin type, potash, calcium and magnesium salts, nitrogenous substances, largely of the amino type, also sugars, gums, lactic and other organic acids.

The essential "corn solubles" in so far as the purposes of this invention are concerned, are present in steep water in approximately the following amounts:

| | Dry basis. |
|---|---|
| Phosphorus as $P_2O_5$ | 8.00% |
| Potash as $K_2O$ | 6.00% |
| Magnesium as $MgO$ | 3.00% |
| Calcium as $CaO$ | 1.50% |
| Nitrogenous matter (Nx6.25) | 44.00% |

The "steep water" may be used in the fermentation process as employed in the manufacture of compressed bakers' yeast at the gravity at which it is withdrawn from the steep tanks, i. e. usually between 4° and 6° Bé., or, it may be used in a concentrated form, that is to say, after the "light" steep water has been concentrated, preferably in vacuo, to about 25° Bé. This is the gravity at which the steep water is usually added to the gluten feed, the latter being a by-product in the manufacture of starch, glucose and maltose. It may also be used in a dry condition, which however is the subject matter of a separate application. In the manufacture of compressed bakers' yeast I prefer to proceed as follows:

To two parts of sugar syrup I add one part of concentrated steep water. I reduce the gravity of the mixture by adding water so that the resultant gravity will correspond to about 15° Balling, and I raise the temperature to about 95° C. Dependent upon the character of the steep water, I may or may not add at this point other nutrition salts and I have found it advantageous at times to add for instance for every 100 gallons of steep water, about 50 pounds of ammonium phosphate. If the acidity of the "mash" should be insufficient I add an acid preferably a mineral acid and bring the mixture over decidedly to the acid side. I then filterpress the mixture and run the filtrate into the fermenters where sufficient water is added to reduce the gravity to about 4½° Balling. The temperature maintained is between 25° and 30° C. Care should be taken to maintain a sufficient acidity. Then, I add a "seed" yeast in the required quantity and conduct the fermentation in the usual manner under aeration until end fermentation is attained. Finally, the wort is run through separators and the yeast through coolers to filter presses and put into finished form in the usual manner.

The use of steep water in the manufacture of yeast involves the following advantages: Improved keeping qualities of the yeast, an increased yield and a reduced cost of manufacture.

I claim as my invention:

1. As a new article of manufacture, bakers' yeast obtained from sugar containing solutions and corn solubles, added thereto.

2. As a new article of manufacture, bakers' yeast obtained from sugar syrup and steep water, added thereto.

3. As a new article of manufacture, bakers' yeast obtained from sugar syrup and concentrated steep water, added thereto.

4. The process of making bakers' yeast which consists in adding corn solubles to a sugar containing solution, then causing the mixture to ferment, and finally separating the yeast.

5. The process of making bakers' yeast which consists in adding corn solubles to a sugar containing solution, adding other nutrition salts, then causing the mixture to ferment, and finally separating the yeast.

6. The process of making bakers' yeast which consists in adding corn solubles to a sugar containing solution, adding other nutrition salts as well as an acid, then causing the mixture to ferment, and finally separating the yeast.

7. The process of making bakers' yeast which consists in adding corn solubles to a sugar containing solution, filter-pressing the mixture, subjecting the filtrate to fermentation, and finally separating the yeast.

8. The process of making bakers' yeast which consists in adding corn solubles to a sugar containing solution, adding other nutrition salts, filter-pressing the mixture, subjecting the filtrate to fermentation, and finally separating the yeast.

9. The process of making bakers' yeast which consists in adding corn solubles to a sugar containing solution, adding other nutrition salts and an acid, filter pressing the mixture, subjecting the filtrate to fermentation, and finally separating the yeast.

10. The process of making bakers' yeast which consists in adding to sugar syrup concentrated steep water and water sufficient to reduce the gravity, filter-pressing the mixture, subjecting the filtrate to fermentation while maintaining a sufficient acidity, and finally separating the yeast.

In testimony whereof I affix my signature.

THEODORE B. WAGNER.